US012409531B1

(12) United States Patent
Liu

(10) Patent No.: US 12,409,531 B1
(45) Date of Patent: Sep. 9, 2025

(54) TELESCOPIC PICKER

(71) Applicant: Daiti Liu, Yangchun (CN)

(72) Inventor: Daiti Liu, Yangchun (CN)

( * ) Notice: Subject to any disclaimer, the term of this patent is extended or adjusted under 35 U.S.C. 154(b) by 0 days.

(21) Appl. No.: 19/211,867

(22) Filed: May 19, 2025

(30) Foreign Application Priority Data

Apr. 25, 2025 (CN) ......................... 202520805102.4
Apr. 25, 2025 (CN) ......................... 202520805103.9

(51) Int. Cl.
*B25B 9/00* (2006.01)

(52) U.S. Cl.
CPC ...................................... *B25B 9/00* (2013.01)

(58) Field of Classification Search
CPC .................................... B25J 1/04; B25B 9/00
See application file for complete search history.

(56) References Cited

U.S. PATENT DOCUMENTS 6,520,556 B1 * 2/2003 Hsu ............................ B25J 1/04 294/115
7,665,782 B2 * 2/2010 Buzby ....................... B25B 9/00 294/109
7,934,756 B2 * 5/2011 Kroeze ...................... B25J 1/04 294/115
9,004,563 B2 * 4/2015 Buzby ....................... B25B 9/00 294/115
11,318,600 B2 * 5/2022 Kroeze ...................... E01H 1/12
2008/0224488 A1 * 9/2008 Khubani .................... B25J 1/04 294/111

* cited by examiner

*Primary Examiner* — Stephen A Vu
(74) *Attorney, Agent, or Firm* — JEEN IP LAW, LLC

(57) ABSTRACT

A telescopic picker is provided, which includes a handle body, a pipe fitting, and a clamping device that are connected in sequence. The handle body is provided with a winding reel, and the winding reel is connected and wrapped with a wire; the wire passes through the pipe fitting and connects to the clamping device. A driving of the wire can drive the clamping device to perform a clamping action, and a length of the pipe fitting can be extended and retracted; a gear plate is connected to the winding reel, and a movable stopper is connected to the handle body through a reset member; the stopper is inserted between teeth of the gear plate to lock the gear plate. The stopper is disengaged from the teeth of the gear plate to unlock the gear plate. There is a movable switch component on the handle body.

11 Claims, 9 Drawing Sheets

TELESCOPIC PICKER

CROSS-REFERENCE TO RELATED APPLICATIONS

This application claims priority to Chinese Patent Application No. 202520805103.9, filed on Apr. 25, 2025 and Chinese Patent Application No. 202520805102.4, filed on Apr. 25, 2025. Both of which are hereby incorporated by reference in their entireties.

TECHNICAL FIELD

The present disclosure relates to the field of clamping structure technologies, and in particular, to a telescopic picker.

BACKGROUND

At present, there are relatively few pickers on the market that can be adjusted for length, and a small number of pickers that have entered the market are more complex to operate and inconvenient to use for length adjustment; besides that it is usually difficult to ensure a normal operation of a clamping action and a length extension control of the pickers at the same time, so it is urgent to design a simple and reliable picker to solve the above problems.

SUMMARY

To solve the problem of complex telescopic operations in the current picker structure, this application provides a telescopic picker.

The technical solution of this application is as follows.

In a first aspect, the present application discloses a telescopic picker, including a handle body, a pipe fitting, and a clamping device connected in sequence; the handle body is provided with a winding reel through a rotation of a torsion spring, and the winding reel is connected and wrapped with a wire; the wire passes through the pipe fitting and is connected to the clamping device, a driving of the wire drives the clamping device to perform a clamping action; a length of the pipe fitting is adjustable;

- the winding reel is connected with a gear plate, and the handle body is connected with a movable stopper through a reset member; the stopper is engaged and matched with the gear plate;
- the handle body is provided with a movable switch component, and the movable switch component pushes the wire to drive the clamping device to perform the clamping action;
- the movable switch component is connected to a control member corresponding to the stopper, and a movement of the control member controls the stopper to detach or insert into teeth of the gear plate; the movable switch component has a use state, and in the use state, the stopper is inserted between the teeth of the gear plate to lock the gear plate; and the movable switch component pushes against the wire to drive the clamping device to perform the clamping action.

In some embodiments of the present disclosure, the pipe fitting includes a plurality of connecting pipes that are interlocked and move along an axial direction, and adjacent two connecting pipes are connected by a lockable structure.

In some embodiments of the present disclosure, the reset member is an elastic reset member; the stopper has a protrusion on one side facing the movable switch component; the control member is located at one end of the movable switch component facing the stopper; the movable switch component has a non-use state, and in the non-use state, the control member abuts against the protrusion to force the stopper to overcome an elastic force of the reset member and disengage from the teeth of the gear plate.

In some embodiments of the present disclosure, the clamping device includes a clamp seat, a pull rod assembly, and a clamp structure; the pull rod assembly is connected to the wire and is moved along an axial direction of the pipe fitting to drive the clamp structure for clamping; the pull rod assembly is connected to the clamp seat through a return spring.

In some embodiments of the present disclosure, the movable switch component is rotatably connected to a trigger of the handle body, the trigger includes a lever and a driven rod connected to each other and arranged at an angle, and the control member is located on one side of the driven rod facing the stopper; the other end of the driven rod is connected to the wire.

In some embodiments of the present disclosure, the lever is rotatably connected to a first roller, and the wire passes through and abuts against a lower side of the first roller.

In some embodiments of the present disclosure, a through hole is provided on the handle body corresponding to the driven rod for an entry and exit of the handle body; and/or,

- an installation hole is provided on the driven rod, and the first roller is rotatably connected inside the installation hole; the wire passes through the installation hole and abuts against a lower side of the first roller.

In some embodiments of the present disclosure, a second roller is further rotatably provided in the handle body, the second roller is provided on a first side of the first roller along an extension direction of the pipe fitting, and the wire passes through respectively upper and lower opposite sides of the second roller and the first roller; and/or,

- a third roller is further rotatably provided in the handle body, where the third roller is provided on a second side of the first roller along an extension direction of the pipe fitting, and the wire passes through respectively upper and lower opposite sides of the third roller and the first roller.

In some embodiments of the present disclosure, an annular groove is provided on an outer circumference of the first roller.

In some embodiments of the present disclosure, the handle body includes a handle tube connected to the pipe fitting, and a grip handle arranged at an angle to the handle tube; the grip handle is extended radially from the pipe fitting; the lever is provided on one side of the grip handle facing the clamping device; the driven rod is provided on one side of an axis of the pipe fitting facing the lever.

The beneficial effects achieved by this application are as follows.

The telescopic picker of the present application is provided with the movable switch component on the handle body, and the movable switch component can push the wire to drive the clamping device to perform the clamping action. The control member is connected to the corresponding stopper on the movable switch component, and the movement of the control member can control the stopper to detach or insert into the teeth of the gear plate. For example, when in use, a user applies force to the movable switch component, which drives the control member to move, thereby driving the stopper to insert into the teeth of the gear plate through the control member to limit a rotation trend of the gear plate and the winding reel. At this time, since the wire on this end of the winding reel is fixed, the movable switch component can effectively drive the wire to produce an axial displacement, thereby driving the clamping device to perform the clamping action. When the control member is driven to reset, the stopper is disengaged from the teeth of the gear plate, and at this time, the user can control the expansion and contraction length of the pipe fitting. The driving mode of the control and stopper can be, for example, contact, connecting rod connection, etc. Through this structural design, the present application is stable and reliable during the clamping action, while also being able to easily adjust an overall length in the non-use state.

BRIEF DESCRIPTION OF DRAWINGS

The accompanying drawings are incorporated into the specification and form a part of the specification, illustrating embodiments in accordance with the present application and used together with the specification to explain the principles of the present application.

In order to provide a clearer explanation of the technical solutions in the embodiments of the present application or the prior art, a brief introduction will be given below to the accompanying drawings required for the embodiments or the prior art description. It is obvious that for those skilled in the art, other drawings can be obtained based on these drawings without the need for creative work.

One or more embodiments are illustrated by corresponding figures in the accompanying drawings, which do not constitute limitations on the embodiments. Elements with the same reference numbers in the accompanying drawings are represented as similar elements, and unless otherwise specified, the figures in the accompanying drawings do not constitute a scale limitation.

Figure 1:
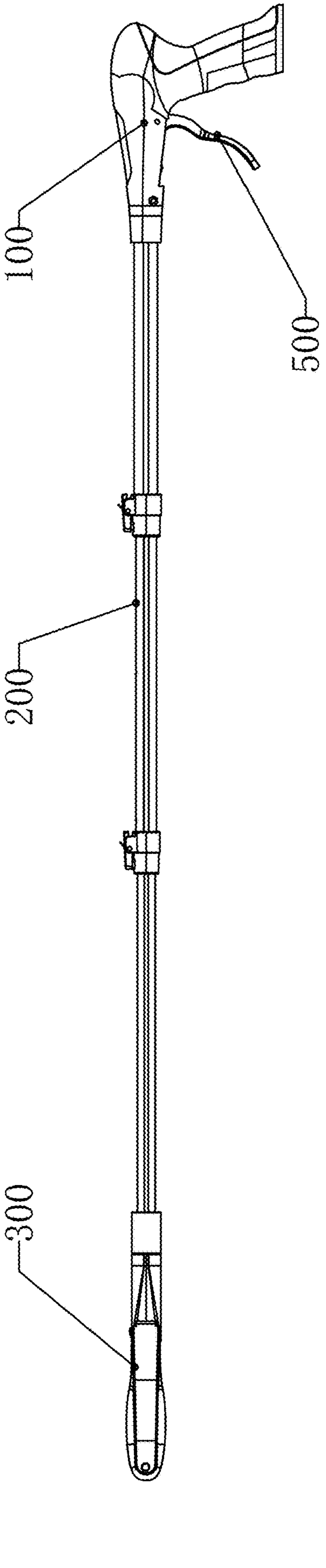

FIG. 1 is a schematic diagram of a front view structure of an embodiment of the present application.

Figure 2:
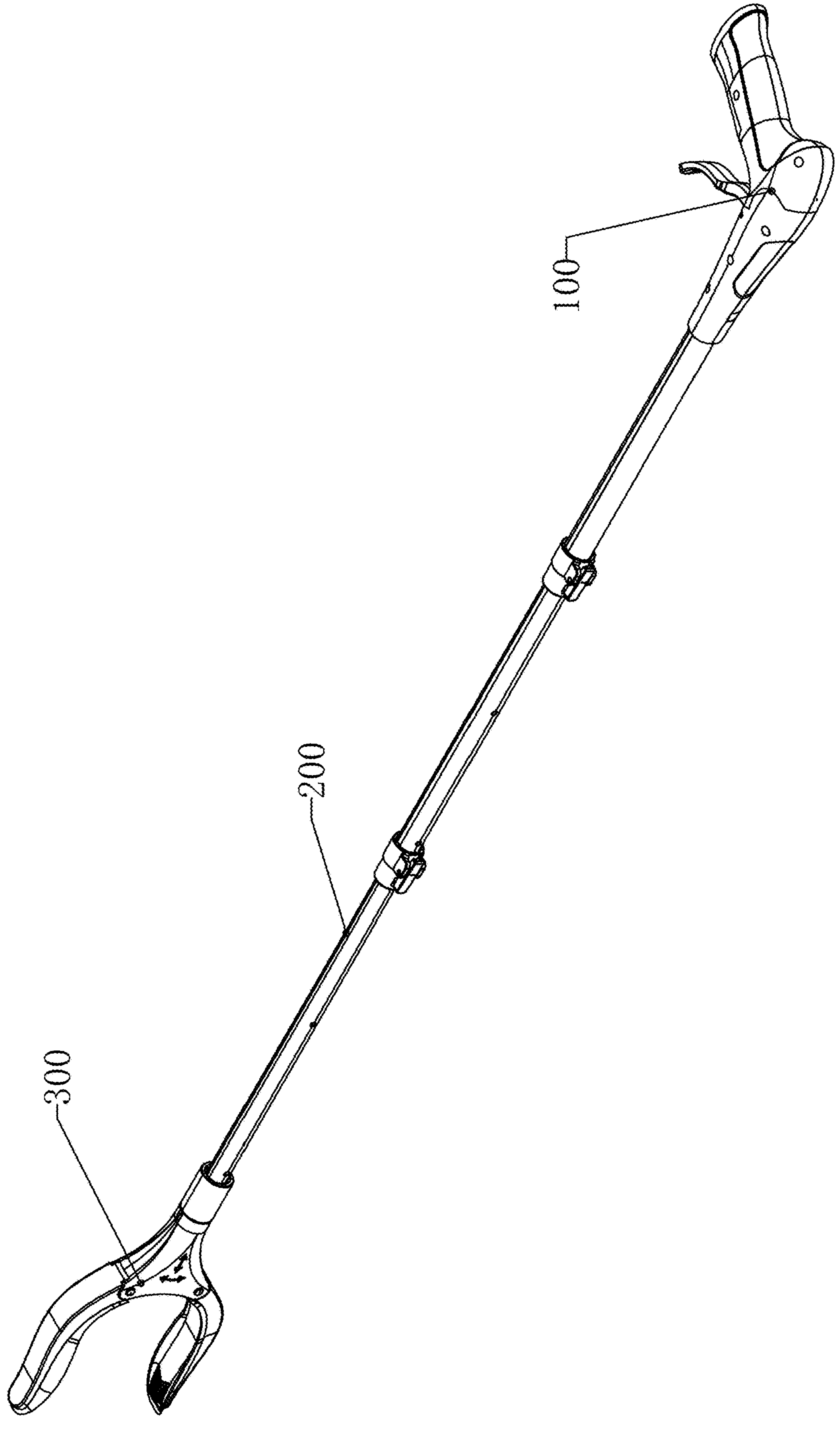

FIG. 2 is a schematic diagram of a first three-dimensional structure of an embodiment of the present application.

Figure 3:
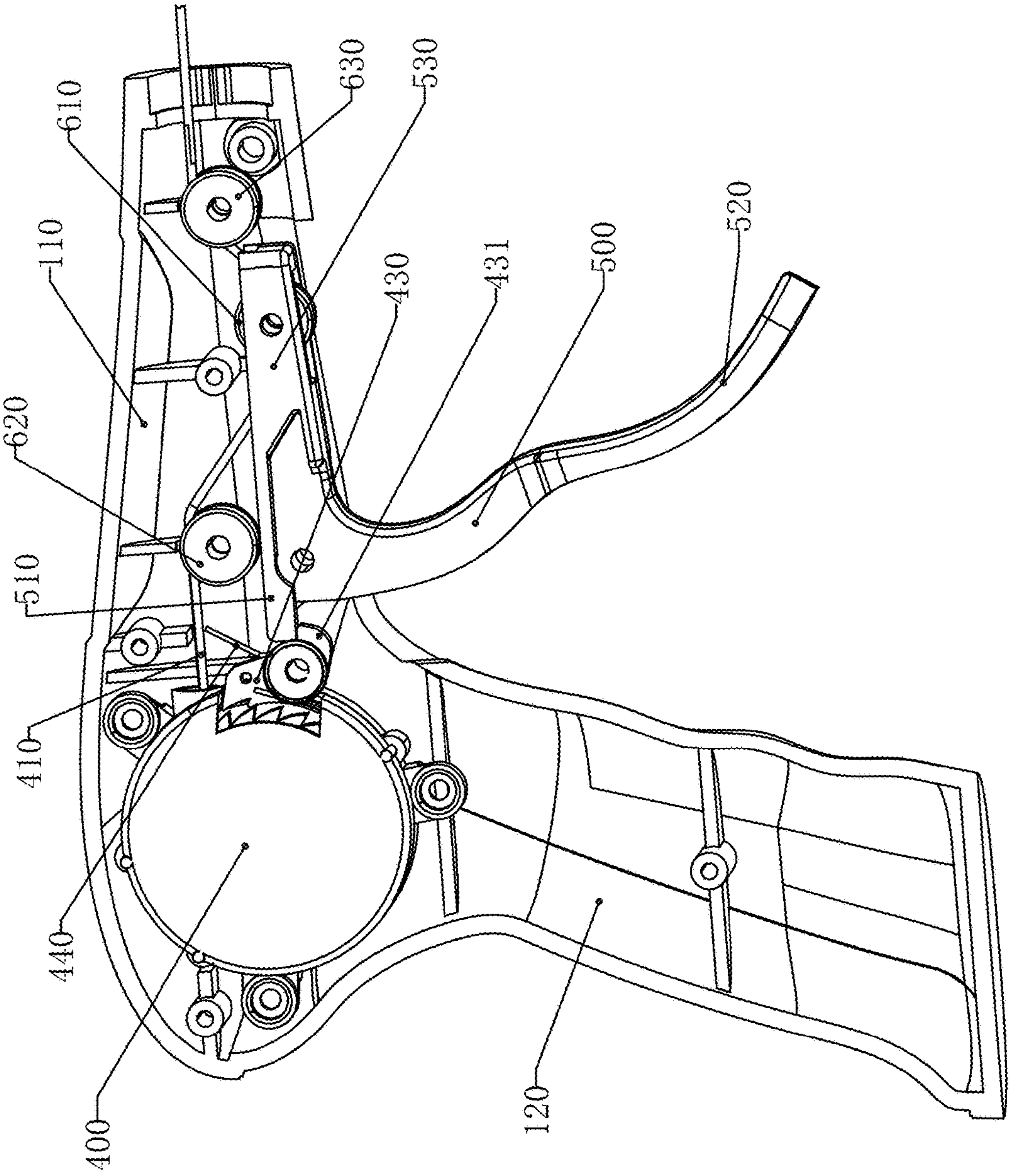

FIG. 3 is a schematic diagram of a first internal structure of a handle body in an embodiment of the present application.

Figure 4:
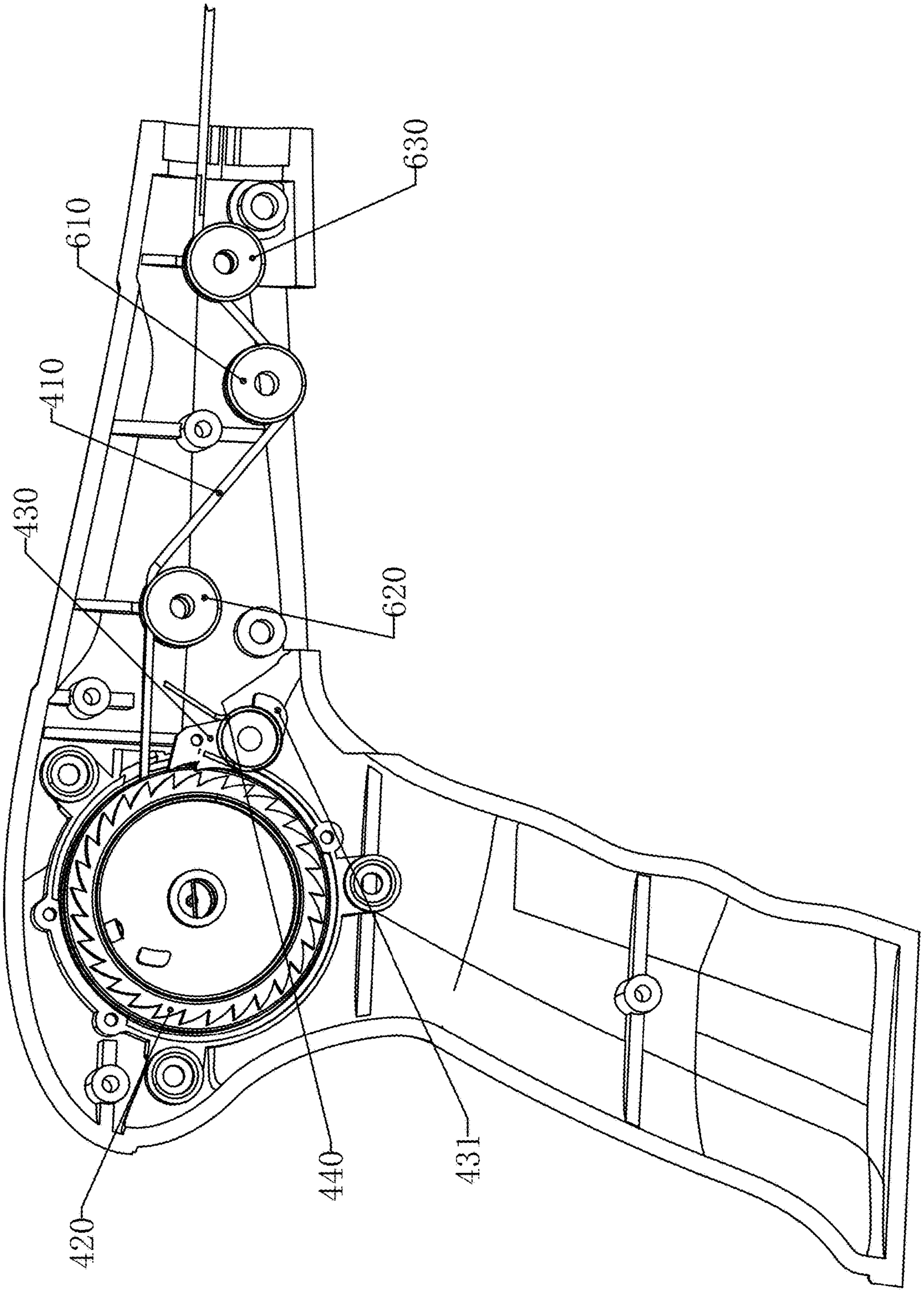

FIG. 4 is a schematic diagram of a second internal structure of the handle body in an embodiment of the present application.

Figure 5:
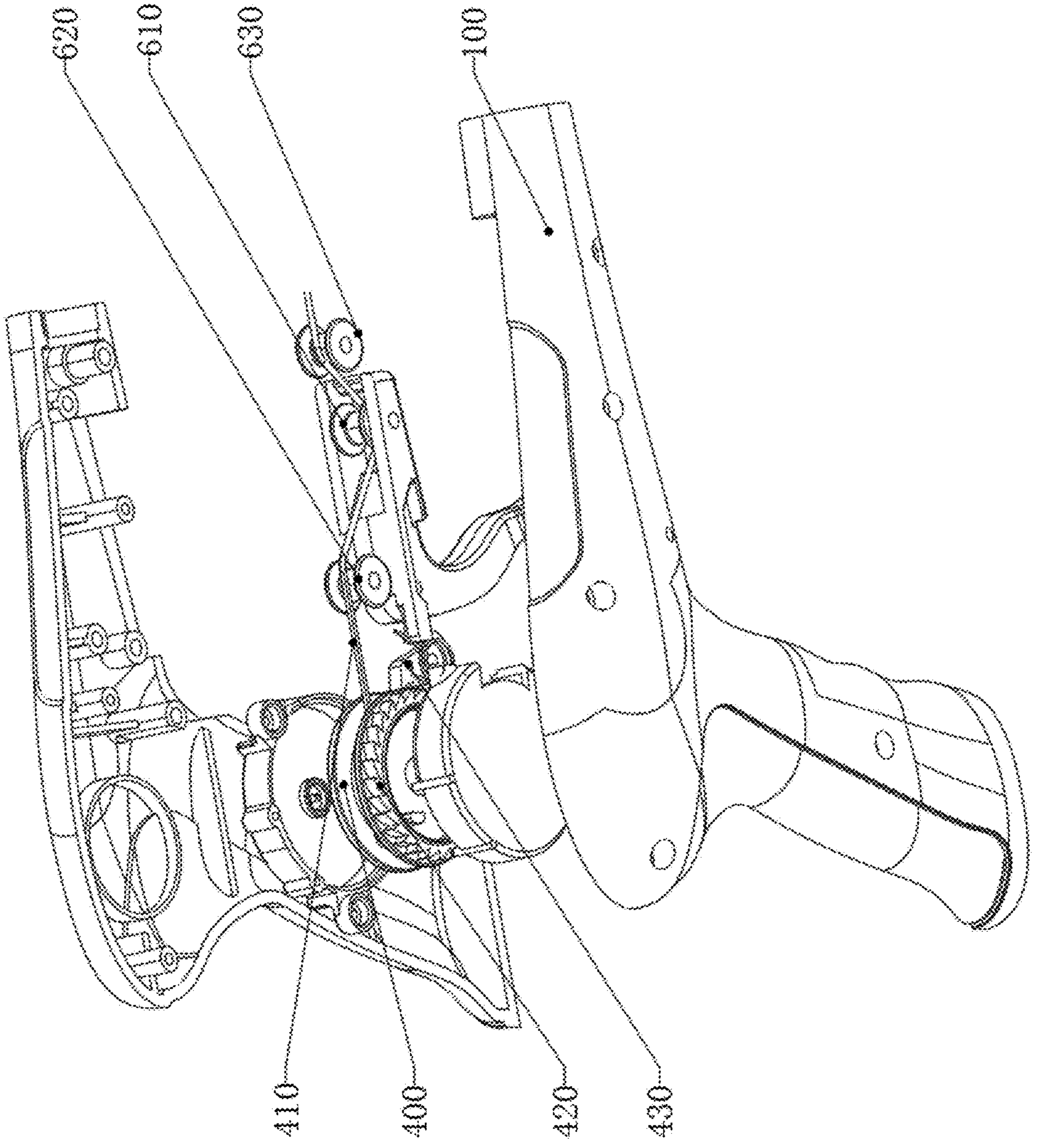

FIG. 5 is a schematic diagram of an explosive structure of the handle body in an embodiment of the present application.

Figure 6:
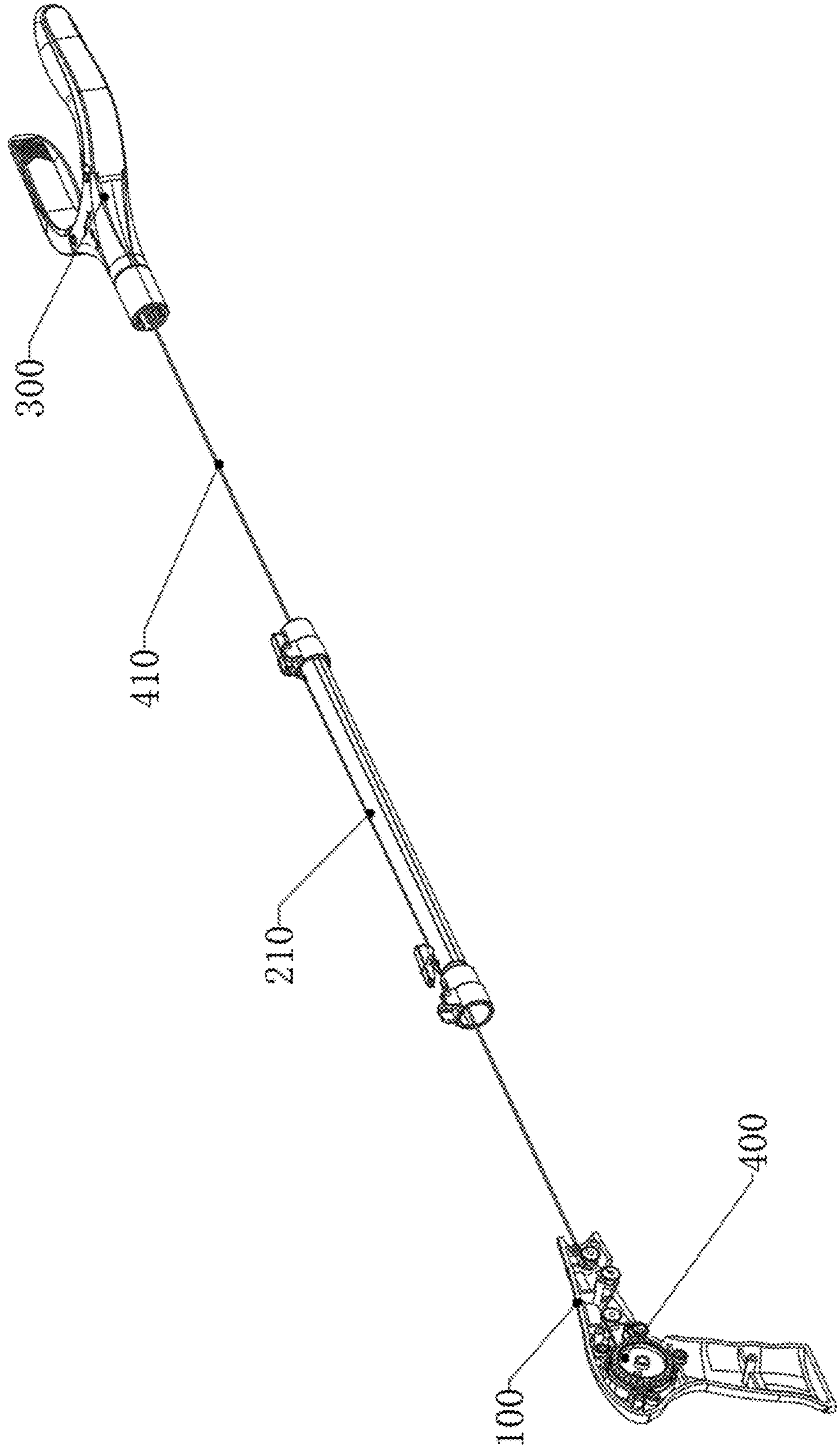

FIG. 6 is a schematic structural diagram of an embodiment of the present application after removing the handle body.

Figure 7:
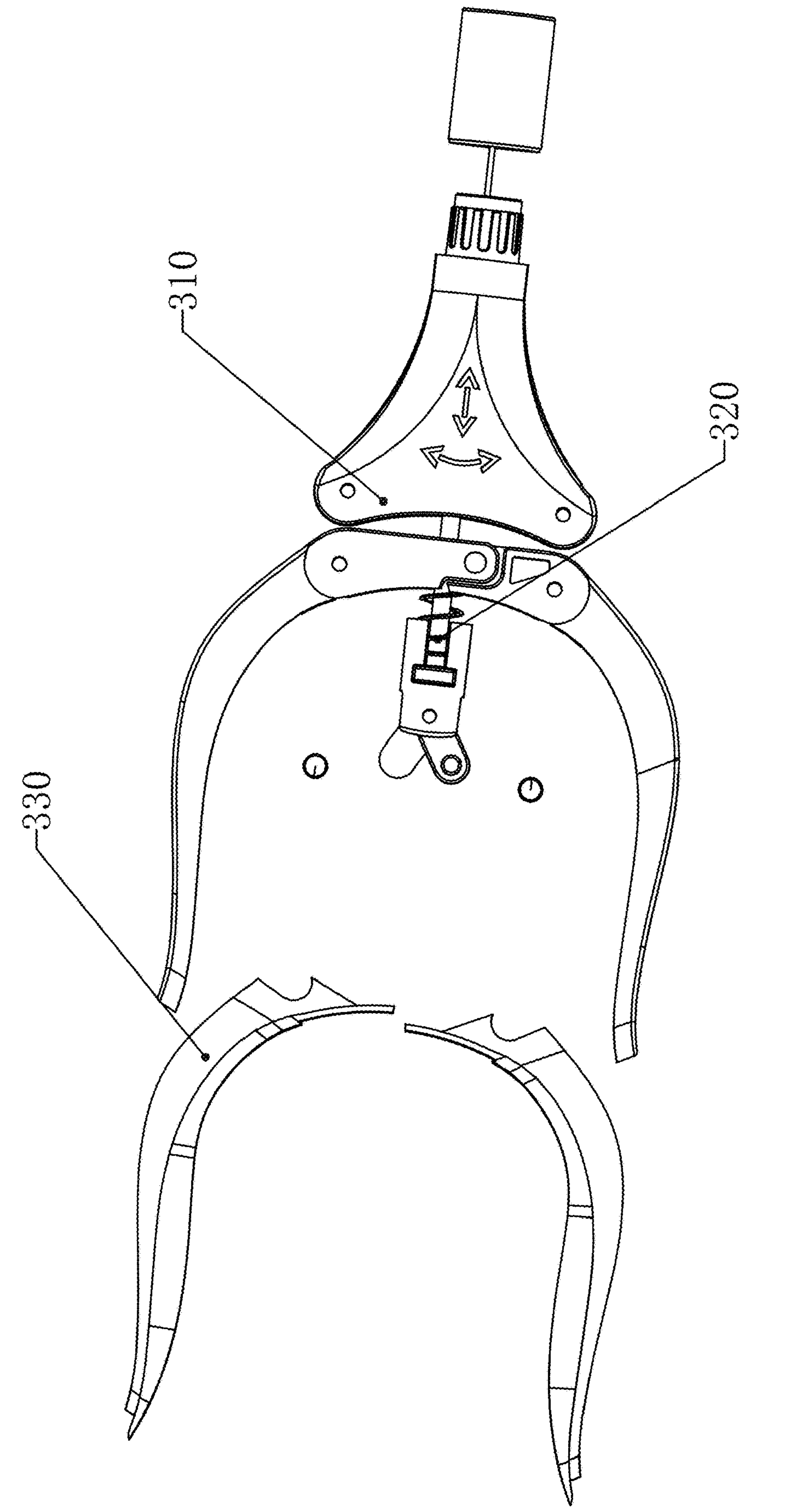

FIG. 7 is a schematic diagram of a first explosive structure of a clamping device in an embodiment of the present application.

Figure 8:
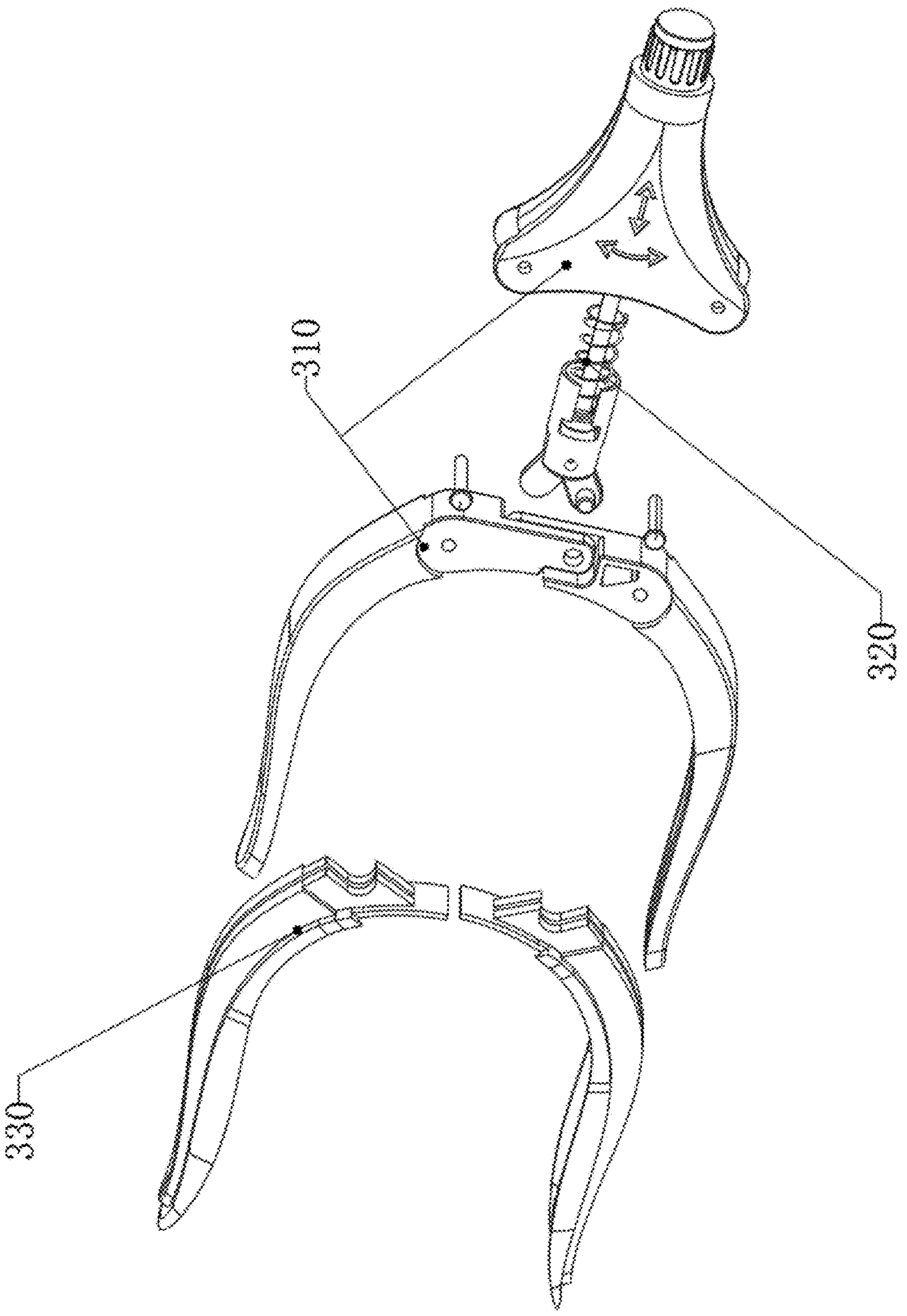

FIG. 8 is a schematic diagram of a second explosive structure of the clamping device in an embodiment of the present application.

Figure 9:
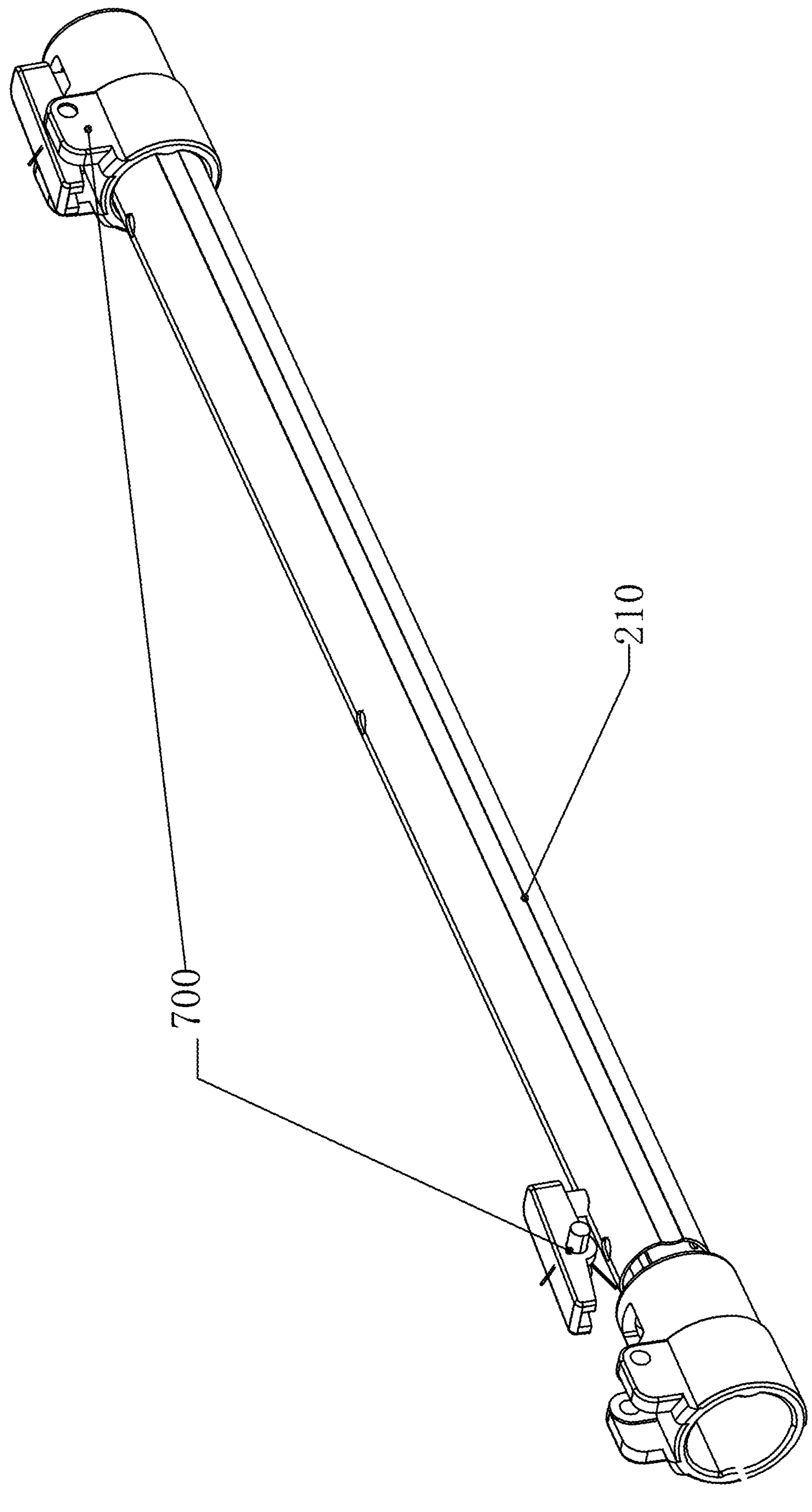

FIG. 9 is a schematic structural diagram of a connecting pipe in an embodiment of the present application.

Numeral reference: 100—handle body; 200—pipe fitting; 300—clamping device; 400—winding reel; 500—movable switch component; 610—first roller; 620—second roller; 630—third roller; 700—lockable structure; 110—handle tube; 120—grip handle; 210—connecting pipe; 310—clamp seat; 320—pull rod assembly; 330—clamp structure; 410—wire; 420—gear plate; 430—stopper; 431—protrusion; 440—reset member; 510—control member; 520—lever; 530—driven rod.

DESCRIPTION OF EMBODIMENTS

In order to clarify the purpose, technical solution, and advantages of the embodiments of the present application, the following will provide a clear and complete description of the technical solution in the embodiments of the present application in combination with the accompanying drawings. Obviously, the described embodiments are a part of the embodiments of the present application, not all of them. Based on the embodiments in this application, all other embodiments obtained by those skilled in this field without creative work are within the protection scope of this application.

The following disclosure provides many different embodiments or examples to implement different structures of the present application. In order to simplify the disclosure of this application, specific examples of components and settings are described below. Of course, they are only examples and are not intended to limit the scope of this application. Besides that, this application may repeat reference numbers and/or letters in different examples. This repetition is for a purpose of simplification and clarity, and does not indicate the relationship between the various embodiments and/or settings discussed.

This application discloses a telescopic picker, including a handle body 100, a pipe fitting 200, and a clamping device 300 that are connected in sequence; a winding reel 400 is provided in the handle body 100 by rotating a torsion spring, and a wire 410 is connected and wrapped on the winding reel 400. The wire 410 passes through the pipe fitting 200 and is connected to the clamping device 300. The wire 410 can drive the clamping device 300 to perform a clamping action, and a length of the pipe fitting 200 can be extended and retracted; a gear plate 420 is connected to the winding reel 400, and a movable stopper 430 is connected to the handle body 100 through a reset member 440. The stopper 430 is inserted between teeth of the gear plate 420 to lock the gear plate 420; the stopper 430 is disengaged from the teeth of the gear plate 420 to unlock the gear plate 420. The handle body 100 is provided with a movable switch component 500, and the movable switch component 500 can push the wire 410 to produce an axial displacement and drive the clamping device 300 to perform a clamping action; the corresponding stopper 430 on the movable switch component 500 is connected to a control member 510, and a movement of the control member 510 can control the stopper 430 to detach or insert into the teeth of the gear plate 420.

In this embodiment, the handle body 100 is typically used for gripping, the pipe fitting 200 is configured to provide a suitable extension length, and the clamping device 300 is configured to clamp a specified item. The winding reel 400 is provided in the handle body 100 by rotating the torsion spring. The winding reel 400 is wrapped around the wire 410, and the wire 410 passes through the pipe fitting 200 and is connected to the clamping device 300. A driving of the wire 410 can drive the clamping device 300 to clamp, usually at least causing the wire 410 to move along an axial direction of the pipe fitting 200. At the same time, the winding reel 400, combined with an expandable design of the pipe fitting 200, can facilitate a user to adjust a length of the pipe fitting 200 and use it normally.

The gear plate 420 is provided on the winding reel 400, and the gear plate 420 is rotated synchronously with the winding reel 400. There are many installation methods for the gear plate 420, for example, the gear plate 420 is installed coaxially with the winding reel 400. The corresponding gear plate 420 inside the handle body 100 is connected to the stopper 430 through the reset member 440. The stopper 430 is inserted between the teeth of the gear plate 420 to lock the gear plate 420; and the stopper 430 is disengaged from the teeth of the gear plate 420 to unlock the gear plate 420; as can be seen from the above, the stopper 430 has at least two states.

The handle body 100 is provided with a movable switch component 500, and the movable switch component 500 can push the wire 410 to generate an axial displacement to drive the clamping device 300 to perform a clamping action. It can be understood that generating an axial displacement can drive the clamping device 300 to perform the clamping action, but the wire 410 can also undergo a radial displacement at the same time. For example, when the movable switch component 500 is moved radially along the pipe fitting 200, it drives the wire 410 to move, and when the wire 410 generates the radial displacement, it also undergoes the axial displacement; a control member 510 is connected to the stopper 430 on the movable switch component 500, and a movement of the control member 510 can control the stopper 430 to disengage or insert into the teeth of the gear plate 420. For example, when in use, the user applies force to the movable switch component 500, which drives the control member 510 to move, thereby driving the stopper 430 to insert into the teeth of the gear plate 420 through the control member 510, to limit a rotation trend of the gear plate 420 and the winding reel 400. At this time, since the wire 410 at this end of the winding reel 400 is fixed, the movable switch component 500 can effectively drive the wire 410 to produce the axial displacement, thereby driving the clamping device 300 to perform the clamping action. When the control member 510 is driven to reset, the stopper 430 is disengaged from the teeth of the gear plate 420. At this time, the user can control the extension and contraction length of the pipe fitting 200. The driving mode of the control member 510 and stopper 430 can be, for example, contact, connecting rod, etc. Through this structural design, the present application is stable and reliable during the clamping action, while also being able to easily adjust an overall length in a non-use state.

In an implementation mode, the clamping device 300 includes a clamp seat 310, a pull rod assembly 320, and a clamp structure 330. The pull rod assembly 320 can move along an axial direction of the pipe fitting 200 to drive the clamp structure 330 for clamping. The pull rod assembly 320 is connected to the clamp seat 310 through a reset spring.

In this embodiment, the clamp seat 310 serves not only to connect the pipe fitting 200 but also to support and install the clamp structure 330 and the pull rod assembly 320. The pull rod assembly 320 can move along the axial direction of the pipe fitting 200 to drive the clamp structure 330 to clamp. For example, when the pull rod assembly 320 is moved along the pipe fitting 200 towards the winding reel 400, the pull rod assembly 320 drives the clamp structure 330 connected to it to perform the clamping action. When the pull rod assembly 320 is reset by the reset spring, the clamp structure 330 is opened to release the clamping state.

In an implementation mode, the reset member 440 is an elastic reset component, which can make an elastic force of the reset spring greater than that of the reset member 440. In this way, the control member 510 on the movable switch component 500 can maintain a compressed state against the stopper 430 in the non-use state of the present application.

In an implementation mode, the clamp structure 330 includes two clamp finger components. The clamp seat 310 has a tubular end and is connected to the pipe fitting 200. The pull rod assembly 320 is provided in the clamp seat 310 and its first end is connected to the wire 410. A second end of the pull rod assembly 320 is connected to two clamp finger components. The pull rod assembly 320 can move along the pipe fitting 200 to drive the two clamp finger components to close or move away from each other for clamping or opening.

In this implementation, the movement of the pull rod assembly 320 can drive the two finger clamping components to close each other and perform the clamping action, or drive the two finger clamping components to move away from each other and open; a specific structural design of the finger clamping component is a conventional technology and will not be further elaborated.

In an implementation mode, the movable switch component 500 should have at least a use state and a non-use state. In the use state, the stopper 430 is inserted between the teeth of the gear plate 420 to lock the gear plate 420; and the movable switch component 500 pushes against the wire 410 to drive the clamping device 300 to perform the clamping action. In the non-use state, the control member 510 casus the stopper 430 to be disengaged from the teeth of the gear plate 420, allowing the pipe fitting 200 to be extended or shortened at this time.

In an implementation mode, the pipe fitting 200 includes a plurality of interconnected and axially movable connecting pipes 210, and a lockable structure 700 is provided between adjacent two connecting pipes 210.

In this embodiment, when a length of the pipe fitting 200 is adjusted, a locking between the lockable structure and the adjacent connecting pipe 210 is released. At this time, an overall length of the pipe fitting 200 can be adjusted by moving the connecting pipe 210 axially. After the length is adjusted to a preset value, the two adjacent connecting pipes 210 are locked by the lockable structure 700. In an implementation mode, as shown in FIG. 6, the lockable structure 700 is a toggle lock structure, which locks and unlocks two adjacent connecting pipes 210 by rotating the toggle; as for the specific structure, it is a conventional technology and will not be elaborated here.

In an implementation mode, the reset member 440 is an elastic reset component; a protrusion 431 is provided on one side of the stopper 430 facing the movable switch component 500. The control member 510 is located at one end of the movable switch component 500 facing the stopper 430. The movable switch component 500 has a non-use state. In the non-use state, the control member 510 abuts against the protrusion 431 to force the stopper 430 to overcome an elastic force of the reset member 440 and causes the stopper 430 to be disengaged from the teeth of the gear plate 420.

In this embodiment, contact is made between the protrusion 431 and the control member 510, as shown in FIGS. 3 and 4. In the non-use state, the control member 510 abuts against the protrusion 431, and the reset member 440 is compressed and has an elastic reset tendency. It should be understood that the maintenance of this compressed state of the reset member 440 is generally provided by the reset spring in the clamping device 300, which is a conventional technology. Of course, the movable switch component 500 can also be connected to the handle body 100 through an elastic reset component, and the elastic force of the elastic reset component is greater than that of the reset member 440.

In this way, the state can also be maintained. When in use, the control member 510 is moved upward to release the restriction on the stopper 430. The stopper 430 is reset and inserted between the teeth of the gear plate 420 under the elastic force of the reset member 440, thereby locking the gear plate 420.

In an implementation mode, the movable switch component 500 is configured to rotate a trigger connected to the handle body 100, and the trigger includes a lever 520 and a driven rod 530 that are connected to each other and arranged at an angle. The control member 510 is located on one side of the driven rod 530 facing the stopper 430. The other end of the driven rod 530 drives the wire 410.

In this embodiment, the trigger includes a lever 520 and the driven rod 530 that are connected to each other and arranged at an angle. The setting of the trigger makes the clamping action of the clamping device 300 easy to control. By pulling the trigger, the driven rod 530 can drive the wire 410, and then the clamping action is completed through the clamping device 300. This design structure makes the clamping action of the clamping device 300 easy to control and operate.

In an implementation mode, the lever 520 is rotatably connected to a first roller 610, and the wire 410 passes through and abuts against a lower side of the first roller 610.

In this embodiment, by setting the first roller 610, a contact between the wire 410 and the first roller 610 is a rolling contact, which can make the wire 410 easier and smoother to drive, and greatly improve the service life of the wire 410, avoiding the occurrence of wear and tear that may cause breakage.

In an implementation mode, a second roller 620 can be rotatably provided inside the handle body 100, as shown in FIGS. 3 and 4. The second roller 620 is located on a first side of the first roller 610 along an extension direction of the pipe fitting 200, and the wire 410 passes through respectively upper and lower opposite sides of the second roller 620 and the first roller 610.

In this embodiment, the second roller 620 is provided, as shown below. By providing the second roller 620 on one side of the first roller 610 facing the winding reel 400, an outgoing line at the winding reel 400 is made smoother.

In an implementation mode, a third roller 630 is further provided in the handle body 100, and the handle body 100 is provided on a second side of the first roller 610 along an extension direction of the pipe fitting 200, and the wire 410 passes through upper and lower opposite sides of the third roller 630 and the first roller 610.

For example, providing the third roller 630 on one side of the first roller 610 away from the winding reel 400 can significantly reduce the wear of the wire 410. This is because the wire near the clamping device 300 is more prone to wear due to a long-term large tension. The setting of the third roller 630 can greatly improve this situation.

Meanwhile, by providing the second roller 620 and/or the third roller 630, the wire 410 can be well tensioned, rendering it easier for the movable switch component 500 to drive the wire 410, reducing an ineffective working stroke, and thus rendering the overall structure of the present application more compact.

In an implementation mode, annular grooves are provided on outer circumferences of the first roller 610, the second roller 620, and the third roller 630 to facilitate limiting of the wire 410, prevent deviation, and further improve the reliability of the movable switch component 500 when driving the wire 410.

In an implementation mode, the handle body 100 includes a handle tube 110 connected to the pipe fitting 200, and a grip handle 120 arranged at an angle to the handle tube 110. The grip handle 120 is extended radially from the pipe fitting 200. The lever 520 is provided on the side of the grip handle 120 facing the clamping device 300. The driven rod 530 is provided on one side of an axis of the pipe fitting 200 facing the lever 520. This structural design, as shown in FIGS. 1-4, is similar to a pistol shaped design, rendering it easy for a user to grip and smoothly perform the clamping action.

The above description is only specific implementations of the present application, which enables those skilled in the art to understand or implement the present application. Various modifications to these embodiments will be apparent to those skilled in the art, and the general principles defined herein can be implemented in other embodiments without departing from the spirit or scope of the present application. Therefore, this application will not be limited to the embodiments shown in this specification, but will conform to a widest scope consistent with the principles and novel features applied in this specification.

What is claimed is:

1. A telescopic picker, comprising a handle body, a pipe fitting, and a clamping device connected in sequence; the handle body is provided with a winding reel through a rotation of a torsion spring, and the winding reel is connected and wrapped with a wire; the wire passes through the pipe fitting and is connected to the clamping device, a driving of the wire drives the clamping device to perform a clamping action; a length of the pipe fitting is adjustable;

the winding reel is connected with a gear plate, and the handle body is connected with a movable stopper through a reset member; the stopper is engaged and matched with the gear plate;

the handle body is provided with a movable switch component, and the movable switch component pushes the wire to drive the clamping device to perform the clamping action;

the movable switch component is connected to a control member corresponding to the stopper, and a movement of the control member controls the stopper to detach or insert into teeth of the gear plate; the movable switch component has a use state, and in the use state, the stopper is inserted between the teeth of the gear plate to lock the gear plate; and the movable switch component pushes against the wire to drive the clamping device to perform the clamping action;

wherein the reset member is an elastic reset member; the stopper has a protrusion on one side facing the movable switch component; the control member is located at one end of the movable switch component facing the stopper; the movable switch component has a non-use state, and in the non-use state, the control member abuts against the protrusion to force the stopper to overcome an elastic force of the reset member and disengage from the teeth of the gear plate.

2. The telescopic picker according to claim 1, wherein the pipe fitting comprises a plurality of connecting pipes that are interlocked and move along an axial direction, and adjacent two connecting pipes are connected by a lockable structure.

3. The telescopic picker according to claim 1, wherein the clamping device comprises a clamp seat, a pull rod assembly, and a clamp structure;

the pull rod assembly is connected to the wire and is moved along an axial direction of the pipe fitting to drive the clamp structure for clamping;

the pull rod assembly is connected to the clamp seat through a return spring.

4. The telescopic picker according to claim 1, wherein the movable switch component is rotatably connected to a trigger of the handle body, the trigger comprises a lever and a driven rod connected to each other and arranged at an angle, and the control member is located on one side of the driven rod facing the stopper; an another end of the driven rod is connected to the wire.

5. The telescopic picker according to claim 4, wherein the lever is rotatably connected to a first roller, and the wire passes through and abuts against a lower side of the first roller.

6. The telescopic picker according to claim 4, wherein a through hole is provided on the handle body corresponding to the driven rod for an entry and exit of the handle body; or, an installation hole is provided on the driven rod, and the first roller is rotatably connected inside the installation hole; the wire passes through the installation hole and abuts against a lower side of the first roller.

7. The telescopic picker according to claim 4, wherein a second roller is further rotatably provided in the handle body, the second roller is provided on a first side of the first roller along an extension direction of the pipe fitting, and the wire passes through respectively upper and lower opposite sides of the second roller and the first roller; or, a third roller is further rotatably provided in the handle body, wherein the third roller is provided on a second side of the first roller along an extension direction of the pipe fitting, and the wire passes through respectively upper and lower opposite sides of the third roller and the first roller.

8. The telescopic picker according to claim 7, wherein an annular groove is provided on an outer circumference of the first roller.

9. The telescopic picker according to claim 4, wherein the handle body comprises a handle tube connected to the pipe fitting, and a grip handle arranged at an angle to the handle tube;

the grip handle is extended radially from the pipe fitting; the lever is provided on one side of the grip handle facing the clamping device; the driven rod is provided on one side of an axis of the pipe fitting facing the lever.

10. The telescopic picker according to claim 4, wherein a through hole is provided on the handle body corresponding to the driven rod for an entry and exit of the handle body; and an installation hole is provided on the driven rod, and the first roller is rotatably connected inside the installation hole; the wire passes through the installation hole and abuts against a lower side of the first roller.

11. The telescopic picker according to claim 4, wherein a second roller is further rotatably provided in the handle body, the second roller is provided on a first side of the first roller along an extension direction of the pipe fitting, and the wire passes through respectively upper and lower opposite sides of the second roller and the first roller; and a third roller is further rotatably provided in the handle body, wherein the third roller is provided on a second side of the first roller along an extension direction of the pipe fitting, and the wire passes through respectively upper and lower opposite sides of the third roller and the first roller.

* * * * *